United States Patent [19]

Marks

[11] Patent Number: 4,865,670

[45] Date of Patent: Sep. 12, 1989

[54] METHOD OF MAKING A HIGH QUALITY POLARIZER

[76] Inventor: Mortimer Marks, 166-17 Cryders La., Whitestone, N.Y. 11357

[21] Appl. No.: 152,862

[22] Filed: Feb. 5, 1988

[51] Int. Cl.[4] ............................................ B32B 31/12
[52] U.S. Cl. ...................................... 156/99; 156/212; 156/242; 156/246; 264/1.3; 264/2.2; 350/370; 350/417; 350/438; 428/437; 428/913
[58] Field of Search ................ 156/99, 212, 242, 246; 264/1.3, 2.2; 350/370, 417, 438; 428/437, 913

[56] References Cited

U.S. PATENT DOCUMENTS

| | | | |
|---|---|---|---|
| 3,322,598 | 5/1967 | Marks et al. | 264/1.3 X |
| 3,970,362 | 7/1976 | Laliberte | 264/1.3 X |
| 4,659,523 | 4/1987 | Rogers et al. | 264/1.3 |

Primary Examiner—Robert A. Dawson
Attorney, Agent, or Firm—Handal & Morofsky

[57] ABSTRACT

A method and apparatus of applying a polarizing film to a curved lens such as a polarizing prescription lens is disclosed. Mounting of the film on a specialized template allows for convenient drying and rewetting.

15 Claims, 2 Drawing Sheets

METHOD OF MAKING A HIGH QUALITY POLARIZER

TECHNICAL FIELD

This invention relates to a novel method of treating polarized film to be adhered to prescription glass lenses and the product manufactured thereby.

BACKGROUND

While the theoretical possibility of light polarizing filters was known from a very early time, it was not until Alvin and Mortimer Marks grew iodine crystals in the 1930's that useful polarizing materials were first made. Polarizing materials were discovered by William Bird Herapath and were announced in the London Philosophical Papers in the mid 1860's. Cellulose had been dyed with iodine by H. Amvronn and reported in 1919 in "Accidental Double Refraction in Celluloid in 6 Cellulose" and J. Conroy in 1876 reported that microscopic crystals of iodine polarized light. Many others dyed oriented fibers prior to 1930 and reported dichroic effects.

Alvin and Mortimer Marks in the 1930's learned how to grow crystals which attached themselves in an oriented fashion to surfaces such as plastic or glass, and so produced continuous crystalline light polarizers. The new materials, for the first time, allowed the evaluation of the percentage of polarization in naturally polarized light phenomena such as glare, reflection, and the like. Several years later, Edwin Land contributed to the technology by initially using Herapath's iodo quinine sulphate as part of a plastic structure which incorporated minute crystals oriented by stretching. These new relatively inexpensive polarizing materials were almost immediately employed in a wide variety of applications, including, sunglasses, photography, scientific instrumentation, military hardware and so forth.

Of all the potential applications of the new polarizing materials, perhaps the largest promised be the application to eyewear. Indeed, the market in polarized non-prescription sunglasses in the United States is huge. Polarized prescription glasses were first introduced as flat laminated glass blanks that were then ground to prescription. These were costly and heavy to wear because of the thickness of glass required. Despite the fact that polarized prescription lenses, especially in the beginning, were relatively expensive as compared to non-polarizing tinted lenses, the same do have a substantial but small part of the market. Nevertheless, a much larger portion of the market can use prescription polarizing glasses.

The various available alternative solutions have a number of problems. Clip-on polarizers present two extra surfaces for the collection of dust and other vision impairing matter. Clip-ons tend to be, by necessity, rather light in structure and are liable to breakage, blowing off in the wind, and other forms of instability. Accordingly, clip-on polarizers have never captured a portion of the market of prescription eyeglass wearers commensurate with the market share of polarizing non-prescription glasses as compared to tinted non-prescription glasses.

Rather, the need for light attenuating prescription sunglasses has mostly been filled by tinted non-polarizing glasses. These are made by taking finished eyeglasses (in which the lenses have been ground to the desired prescription and further ground to fit the eyeglass frame) and coating the finished product with a filter material. While this material does not exhibit polarizing characteristics, and is thus far inferior to polarizing glasses in its operating characteristics, this method does offer the advantage of a simple efficient and reliable way of attenuating light input into the eyes of the wearer.

However, a small portion of the light attenuating eyeglass market is taken by polarizing prescription sunglasses which are made by taking a glass or plastic blank of reduced thickness, adhering a polarizing film to one of its surfaces and covering the polarized film with yet another glass blank. This forms a sandwich comprising two layers of glass with a layer of polarizing material disposed therebetween. This product can also be made by injection molding of lens plastic around a polarizing filter.

It is necessary to grind the edges of the lens blank to fit them to the eyeglass frame. This can only be done after the polarizing layer has been inserted into the sandwich. This grinding is typically done in the laboratory of the eyeglass retailer. Such "labs" purchase prescription polarizing blanks with a given prescription power for grinding to the particular frame shape to be matched.

In the view of the fragile nature of the polarizing prescription lens, damage to the polarizing layer and/or the transparent sandwich members is likely to occur. The high cost of the blanks together with the above-described likelihood of damage have combined to make the polarizing sandwich lens somewhat impractical as an answer to the problem of providing polarized prescription sunglasses. Nevertheless, in the approximately fifty years since polarizing materials first became available, no other commercially viable solution has been proposed.

DISCLOSURE OF INVENTION

The invention, as claimed, is intended to provide a remedy. It solves the problem of how to provide an inexpensive effective polarizing prescription lens. The inventive method and apparatus overcome the disadvantages of prior art devices and methods involving likelihood of lens damage. In addition, the final product has the advantage of preventing ultraviolet radiation from passing through the eye as well as greatly reducing costs. Moreover, the inventive system may be applied to completely fabricated glasses made of glass, CR 39 or polycarbonate and even used glasses. CR-39 glasses are the preferred base material as CR-39 tends to have the lowest internal stresses. Thus the consumer is presented with the possibility of converting an old pair of glasses to use as prescription sunglasses for a relatively inexpensive price as compared to the present situation of being forced to buy specially fabricated polarizing prescription glasses at relatively great cost. Accordingly, it is estimated that the present invention will, for a small fraction of the present cost of polarized prescription glasses result in substantially identically functioning products.

The above is achieved by applying a polarizing film to a curved surface. In this respect, it is noted that polarizing films because of their highly organized structure at the micron level present special handling problems and their adhesion to a surface curved in two orthogonal directions, as in the case of most prescription lenses, present a special problem addressed by the specialized procedure of the inventive method. In particular, improved uniformity in the product is achieved by mounting the stretched film in a frame, aging it and softening it before adhesion to a glass substrate.

BRIEF DESCRIPTION OF DRAWINGS

One way of carrying out the invention is described in detail below with reference to drawings which illustrate only specific embodiments of the invention, in which.

DETAILED DESCRIPTION

As noted above, to make polarized prescription eyeglasses it has been necessary to obtain polarized blank lenses, into which the polarizing film has already been embedded (in a sandwich type arrangement to allow for grinding without affecting the polarizing material). Polarized blanks are considerably costlier than normal glass or plastic blanks. Therefore breakage and grinding errors become costly, yet are part and parcel of normal industry practice.

Neither passing on, nor absorbing the cost of mistakes or defective materials is acceptable if one wishes to provide reasonably priced eye care.

The objectives achieved by the invention are to not only eliminate the high costs caused by damaged polarized lenses but to also bring down the cost of polarized optical materials while reducing the possibility of defects or grinding errors.

In accordance with the present invention, a casting composition is made in accordance with the technique disclosed in U.S. Pat. No. 3,300,436 of Alvin and Mortimer Marks. In accordance with the present invention, a polyvinyl butyral based casting composition is preferred, despite the customary use of polyvinyl alcohol in the art. This casting composition is filtered through a Pall Trinity 10 micron filter using a peristaltic pump with silicone tubing. The silicon tubing may be obtained from the Walter Cooling Co. of Rosedale, N.Y. under catalog number Masterflex Code No. 6411-18. The filter is available from Pall Trincor of New Jersey.

Figure 1:
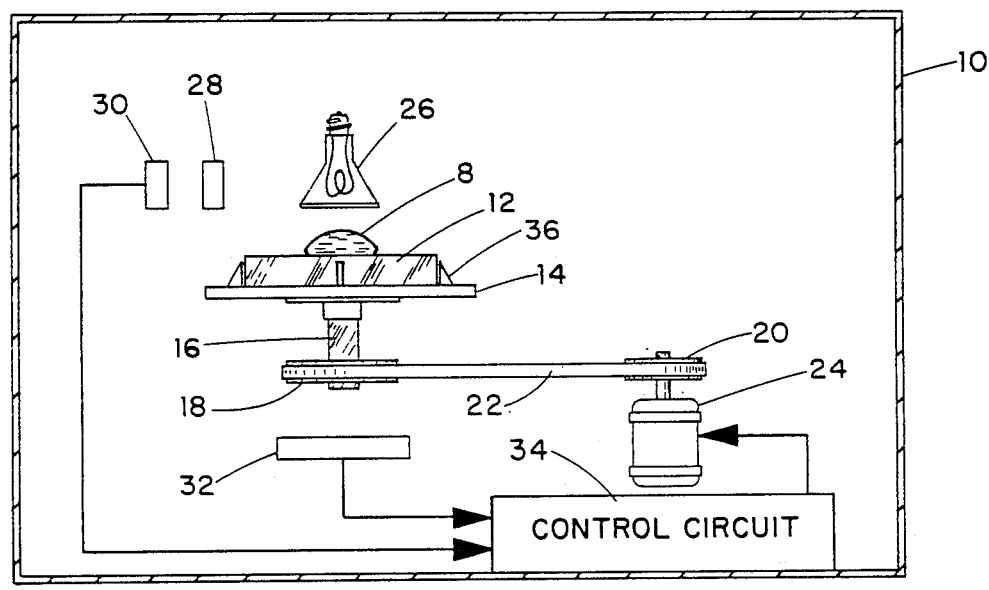
FIG. 1 is a schematic illustration of a film forming a apparatus useful in present invention.

Referring to FIG. 1, forty grams of filtered solution 8 is spun in an airtight chamber 10 at 700 rpm for 10 seconds (or for an additional 3 seconds if the amount of iodine present in the mixture is in one of the higher typical amounts). Spinning is performed on a 10"×10" square glass plate 12 resting on a circular platen 14. Platen 14 is rotated by transparent shaft 16, which in turn is driven by pulleys 18 and 20 which are linked by timing belt 22 which reduces slippage. The system is driven by motor 24.

The spinning time is controlled in the apparatus shown in FIG. 1 by comparison of the mixture color to a standard color. In particular, a light source 26 directly passes light through a filter standard 28 to a photocell 30 whose output is compared to the output of photocell 32, which receives light passed through spun solution 8. Comparison is done by control circuit 34 which stops spinning when the desired color density is reached. The use of an airtight chamber minimizes turbulence and eddy currents. Further reduction of these disturbances is achieved by using a circular platen 14 which has a diameter at least as great as the diagonal length of plate 12. The position of plate 12 on platen 14 is maintained by stops 36.

The resulting spun film is then covered with a glass plate about ¼" above the film to reduce evaporation and allow bubbles to rise while natural surface tension smooths out the film.

Drying is allowed for 30 minutes in an air tight, dust-free container. This is followed by air drying until the color of the film changes from yellow to dark blue.

Figure 2:
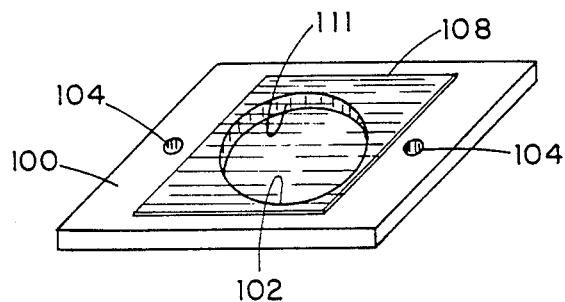
FIG. 2 is a perspective view of a plate bearing polarizing material and useful in accordance with process of the present invention.

The film is then slit ½" from two opposite edges and stretched in one direction to 5 to 6 times its original size, divided in half with a cut perpendicular to the direction of stretching. Each of these halves may then be cut in half again with the cutline in the middle of the half sheet and extending in the direction of stretching, and the quarters coming from a single half sheet placed on plastic plates 100 to correspond to a single pair of glasses (FIG. 2). A large center hole 102 and two bolting holes 104 are defined by each plate 100. Double sided tape or glue disposed along the perimeter of the film and on the plastic plate is used to hold the film in a stretched position. Stretching is done at room temperature (20-22 degrees Centigrade) with a relative humidity of 55% or less.

The stretched film is then aged on the plate 100 for 4 to 10 days to permit the excess iodine to escape. This results in improved color regularity over immediate use of the film. The aging time may be reduced by baking at low temperatures.

The mounted and stretched film may be secured to finished or used eyeglass lenses (whether spherical, astigmatic, or progressive), blank lenses (lenses with only the outside surface finished and usually round in shape), or finished blanks (so-called stock lenses which have two sides finished but which have not been fitted to an eyeglass frame).

In accordance with the present invention a finished lens ready to go into an eyeglass frame and made of glass, CR-39, polycarbonate or the like is subjected to surface treatment so that adhesion of the polarizing film may be achieved by means of an intrinsic bond between the surface of the lens and the butyral-lithium-iodine polysilicate complex formed by processing.

The surface preparation formula contains:
Sulphuric Acid (98.08%) 500 parts by weight
Chromium Trioxide 1 part by weight Such surface preparation formula is placed on a glass concave surface which has a curvature close to that of the CR-39 lens to be treated. Then one lays the CR-39 lens onto the acid with the concave glass surface of the glass surface in contact with the convex lens surface for 20 seconds causing the acid to be distributed about the entire surface to be treated. The lens is then washed in water and dried. Work should be done in a ventilated area and a rubber apron, gloves and protective eye covering should be used when working with this acid mixture.

Treatment of the surface may alternatively be accomplished by use of a plasma generator for up to 1 minute. Also, a combination of both these treatments may be used.

One then measures the curvature of the lens with a lens gauge.

Figure 3:
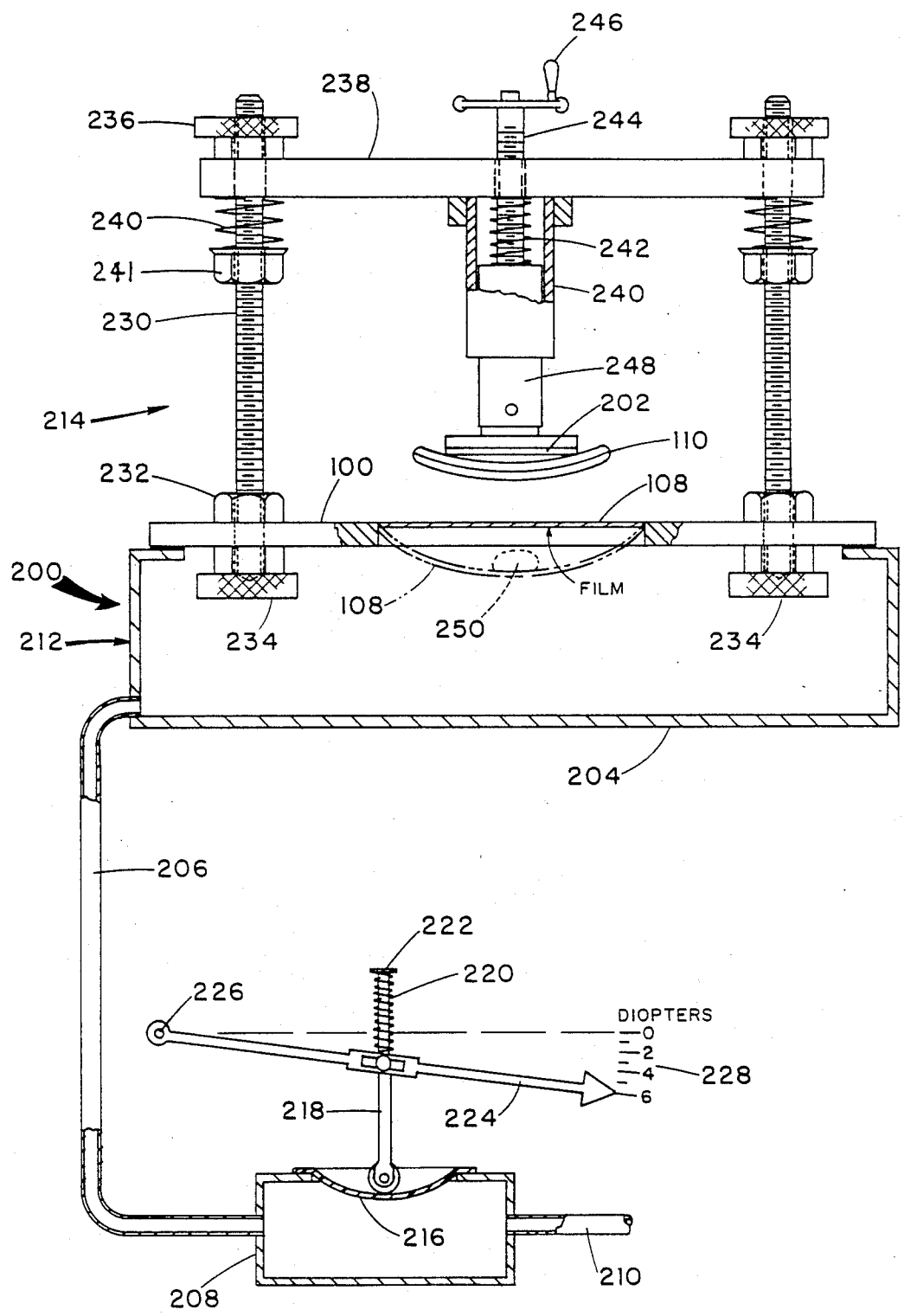
FIG. 3 is a schematic illustration of apparatus useful for adhering polarizing film to a curved prescription lens in accordance with the method of the present invention.

The prepared lens 110 is then secured in place in an apparatus 200 shown in FIG. 3 by means of adhesive material 202 making sure that the lens axis and the film polarization direction are aligned so that the polarizing film 108 will maximally filter out reflected glare when the coated lens is inserted in a pair of finished sunglasses.

The film, mounted on base plate 100 and secured thereto by, for example, glue or double stick tape disposed around hole 102, is inverted to form container with film 108 as its base so that the back of the film may be treated with softening fluid made in accordance with the following recipe:

| SOFTENING FLUID | |
| --- | --- |
| Distilled Water | 100 parts |
| Diacetic Alcohol | 1 part |
| Normal Propanol | 4 parts |
| Acetic Acid (glacial) | 17 parts |
| Hydrochloric Acid (37%) | 1 part |
| (1% in distilled water) | |
| Total | 122 parts |

The compartment formed by the sidewalls 111 of hole 102 is filled with softening fluid to wet the back of the film. It is important that only the back of film 110 is wet because remaining softening fluid will interfere with later process steps. This is done for 75 seconds. The fluid is then drained and the surface is air blown to remove remaining droplets.

One then places the base plate 100 with film 108 into apparatus 200, bringing the back of the film about ¼ inch from the front etched surface of the lens to be coated. A slight vacuum is engaged in chamber 204 through tube 206, gauge 208 and vacuum line 210 to achieve the curvature needed on the film to match the lens surface as shown in phantom lines. One then wets the film with a few cubic centimeters of distilled water (or other liquid). It is noted that for relatively flat surfaces, a vacuum may not be necessary.

Apparatus 200 includes a vacuum portion 212 and a mounting portion 214. Vacuum portion 212 comprises a vacuum circuit made of vacuum line 206, gauge 208 and vacuum line 210 and is attached to a vacuum source whose pressure may be regulated. Gauge 208 includes a top flexible membrane 216 which moves downwardly in response to the application of vacuum. This causes a follower 218 to also move down against the force of a spring 220. Spring 220 is fixed at one end to follower 218 and to a fixed point 222. Follower 218 is, in turn, pivotely connected to an indicator 224 which is pivoted at a point 226 and will give an indication calibrated to diopters of the power of a lens on a scale 228 in response to pressure which causes curvature of membrane 216 and a corresponding indication on the scale of the curvature of film 108 in response to the application of pressure. Thus it is possible using this apparatus to regulate the vacuum pressure to the point where the shape of deformed film 108 shown in FIG. 3 may be made to substantially match curvature of a lens surface to receive a polarized film layer.

Support portion 214 comprises a pair of threaded members 230 which are secured to plate 100 by bolts 232 and knurled bolts 234. At the opposite end, nuts 236 act against a support 238 and springs 240 which bear against bolts 242 to provide an adjustable mounting for support 238. Support 238 includes a tube 240 which is biased in the direction toward support 238 by a spring 241 which is advanced by rotation of threaded member 244 which is secured to rotating knob 246. This causes advancement of square ram 248 whose outside shape matches the inner diameter of square tube 240 thus allowing advancement of ram 248 with a lens 110 mounted thereon toward film 108 without rotation of the film. In connection with this it is noted that plate 100 and vacuum chamber 212 are sealed to each other allowing the maintenance of a lower pressure within chamber 212 in order to deform film 108 into the shape illustrated in phantom lines in FIG. 3. Generally, the shape of the film must be very slightly less concave than the glass surface to be coated is convex. This allows the central point of the convex surface to be coated to be the first portion to contact the film. As the ram is advanced, it stretches the remainder of the film into contact. This stretching should be minimized so the difference in concavity should be as small as possible. If, on the other hand the surface of the film is slightly more concave, it will trap the liquid and the polarized coating will be defective.

To achieve lamination one tightens the knob 246 to make contact between the film 108 with distilled water 250 on it and the lens to be coated. Alternatively to water 250 one may use any liquid that does not attack or otherwise adversely affect the polarizing film, or even an adhesive or other material. One then slightly tightens somewhat more than necessary for contact with film 108 to achieve good adhesion. The formed coating may then be checked by viewing through another polarizing filter to check the quality of the product. One then waits 45 minutes and removes the lens, with the attached film, along with the ram assembly from chamber 204. The lens is then placed face up in an air oven and baked for 15 minutes at 77° C. After baking one trims the film to the edge of the lens using a sharp blade.

The trimmed lens is removed from the ram and then baked, face up, for 2 hours at 68 degrees C. and then allowed to air dry overnight (approximately 12 hours). A first silication solution is applied to the lens for 15 seconds to lock in the iodine. The lens is then spun briefly and air blown dry and placed under a heat lamp for 5 minutes.

This first silication step can be done effectively at 60% relative humidity or less. Above 60% relative humidity the lens will become cloudy and the silication does not effectively stabilize the lens. The silication solution was formulated as follows:

Butyl Alcohol 20 parts
Tetraethylorthosilicate 80 parts

Tetraethylorthosilicate is manufactured by Union Carbide, Coating Chemicals Division of Danbury, Conn.

A silicate resin solution which serves the purpose of sealing the surface is then applied in a second silication step to the lens which is then briefly spun to spin of excess resin solution. The lens is then air dried under a heat lamp for 5 minutes. The lens is then placed in an oven for 2 hours at 77 degrees centigrade. After two hours in the oven, the lens is cooled to room temperature.

The second step silicate resin solution used was made by first forming a base which contained the following:

| | |
| --- | --- |
| Butyl Acetate | 22.0 parts by weight |

-continued

| | |
|---|---|
| Acetic Acid | 7.0 parts by weight |
| Toluene | 17.0 parts by weight |
| Methyl Isobutyl Ketone | 48.0 parts by weight |
| Butyl Lactate | 25.0 parts by weight |
| Normal Propanol | 20.0 parts by weight |
| XYSG | 6.6 parts by weight |
| Total | 145.6 parts |

The base was then filtered through a 10 micron Pall filter. To 14 parts of base was added:

Silbond (ethyl silicate pure) 3 parts
Butyl Acetate 5 parts
Toluene 5 parts

Silbond is manufactured by Stauffer Chemical Co., Specialty Chemicals Division of Westport, Conn.

Owens Illinois Hard Coat is then applied to the lens. The hard coat is modified by the addition of an additional catalyst which acts to overcome the iodine which it prevents escaping. The catalyst is included in the hard coat in the amount of 3% instead of 2%. The lens is then baked for four hours at approximately 82 degrees Centigrade.

Figure 4:
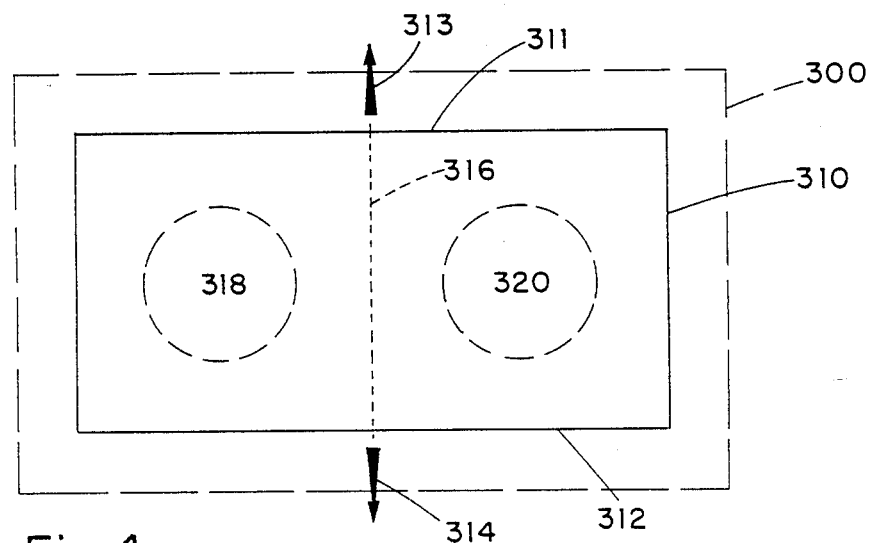
FIG. 4 shows the cutting of stretched film for a matched pair of polarized lenses.

Matched lenses may be made by matching the amount of stretch of the polarizing film 310 a shown in FIG. 4. Here the film has been stretched by grasping edges 311 and 312 and pulling in the direction of arrows 313 and 314 respectively. Stretching tends to be uniform perpendicular to the direction of stretch. Thus cutting along line 316 yields a pair of substantially matched film members 318 and 320. If desired cutting may be dispensed with and a two hole base plate 300 used, as shown in phantom lines.

Figure 5:
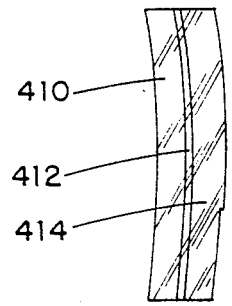
FIG. 5 shows the formation of a bifocal polarizing lens.

Specialized lenses may also be fabricated in accordance with the present invention. For example, bifocals with segments protruding cause the polarized film to disorient due to the build up of fluid, such as the softening fluid which is retained during processing. A solution to this problem is the application of the polarized film to the entire lens and then stripping of the film away from the bottom portion of the lens, which because of its shape causes the problem. Removal of the film is easily accomplished by cutting and lifting off the film before silication and/or baking results in firmly attaching the film to the CR-39 lens. The remaining portions of the process are the same. Alternatively, a smooth lens 410 as shown in FIG. 5, covered with film 412 can be cemented to a bifocal member 414.

Also, treating the surface of a blank with a plasma generator, or treating with NaOH or KOH will sufficiently etch the surface to cause polarized film to adhere. Likewise, the process is not limited to spinning polarized film on glass. The purpose of the spinning technique is to obtain uniformity and have a well finished surface. A glass wheel machine can also be used.

The barrier coating silicate resin solution can also be overcoated with a photoresist coating then exposed to strong ultraviolet light where it becomes insoluble and prevents other hard coats from attacking the polarizing compositions. Catalysts such as benzoyl peroxide will not then permeate the barrier and monomers such as CR-39 can be molded over and in contact with the surface.

While illustrative embodiments of the invention have been described, it is, of course, understood that various modifications will be obvious to those of ordinary skill in the art. Such modifications are within the spirit and scope of the invention which is limited and defined only by the appended claims.

I claim:

1. A method of making a polarized lens, comprising the steps of:
   (a) making a flexible and stretchable polarizing film;
   (b) mounting said polarizing film on a plate having a hole disposed therein, whereby said hole and said polarized film together define a chamber for containing a liquid;
   (c) aging said mounted film;
   (d) filling said chamber with a softening solution after said aging;
   (e) draining said softening solution;
   (f) putting said film and said lens in facing spaced relationship to each other, with the surface of the lens to be adhered to the film in facing relationship to the surface of the film to be adhered to the lens;
   (g) bringing said lens and said film closer together and advancing them relatively to the point where said film and said lens are in intimate contact over an area and said liquid has bene substantially excluded from between said lens and said film; and
   (h) curing said film on said lens.

2. A method as in claim 1, wherein a small quantity of liquid is introduced between said surfaces of said lens and said film during said advancing.

3. A method of making a polarized lens as in claim 1, further comprising the step of:
   (a) forming said polarizing film into a shape which approximately conforms to the shape of the surface of said lens to which said polarizing film is to be adhered prior to bringing said film closer to said lens.

4. A method as in claim 3 wherein said liquid is water.

5. A method of making a polarized prescription sunglass lens, comprising the steps of:
   (a) taking a blank lens with a given prescription power and grinding the edges of the same to a shape which conforms to the shape of a desired spectacle frame;
   (b) making a flexible and stretchable polarizing film;
   (c) mounting said polarizing film on a plate having a hole disposed therein, whereby said hole and said polarized film together define a chamber for containing a liquid;
   (d) aging said mounted film;
   (e) filling said chamber with a softening solution after said aging;
   (f) draining said softening solution;
   (g) pressure forming said polarizing film into a shape which approximately conforms to the shape of the surface of said lens to which said polarizing film is to be adhered;
   (h) putting said film and said lens in facing spaced relationship to each other, with the surface of the lens to be adhered to the film in facing relationship to the surface of the film to be adhered to the lens;
   (i) advancing said lens relative to said film to the point where said film and said lens are in intimate contact over an active area of said lens; and
   (j) curing said film on said lens.

6. The method as in claim 5 wherein said conforming is achieved by applying a lower pressure to the surface of said film opposite the surface to be adhered to the lens than the pressure present at said surface to be adhered.

7. A method as in claim 6 wherein said curing comprises the steps of:
- (k) applying said lens to said film with pressure;
- (l) allowing a period of time to pass;
- (m) baking said lens with said film disposed thereon for a period of time between three and twenty-five minutes at 60°–90° C.;
- (n) trimming the edge of the filter on the lens;
- (o) baking the trimmed lens for 15 minutes to six hours;
- (p) allowing the baked lens to dry;
- (q) applying a silication solution; and
- (r) applying a hard coat solution.

8. The method of claim 5 further comprising treating a CR-39 lens in preparation for film coating in which an acid surface preparation formula is put on a glass lens concave side and a convex surface of said CR-39 lens is laid onto the acid after which the CR-39 lens is washed in water and dried.

9. The method of claim 1, said softening solution comprising:
Distilled Water
Diacetone Alcohol
Normal Propanol
Acetic acid (glacial)
Hydrochloric Acid (37%) (1% in distilled water).

10. A method as in claim 9, wherein concentrations are as follows:
Distilled Water 80–150 parts by weight
Diacetone Alcohol 0–3 parts by weight
Normal Propanol 1–6 parts by weight
Acetic Acid (glacial) 12–30 parts by weight
Hydrochloric Acid (37%)(1% in distilled water ) 0–3 parts by weight.

11. The method of either claim 1 or claim 5, wherein a protective coating is applied to the polarizing film permitting stabilization of the film, the coating being comprised of:
(a) a base comprising:
Butyl Acetate
Acetic Acid
Toluene
Methyl Isobutyl Ketone
Butyl Lactate
Normal Propanol
XYSG (polyvinyl butyral finely ground) and
(b)
Ethyl Silicate
Butyl acetate
Toluene.

12. A method as in claim 11, wherein the concentrations are as follows:
(a) fourteen parts of a base comprising:
Butyl Acetate: 10–25 parts by weight
Acetic Acid: 5–15 parts by weight
Toluene: 12–30 parts by weight
Methyl Isobutyl Ketone: 25–60 parts by weight
Butyl Lactate: 0–30 parts by weight
Normal Propanol: 0–30 parts by weight
XYSG (polyvinyl butyral finely ground): 2–14 parts by weight and
(b)
Ethyl Silicate: 0.5–3 parts by weight
Butyl Acetate: 4–6 parts by weight
Toluene: 3–7 parts by weight.

13. A method of making a polarizing lens, comprising the steps of:
- (a) spinning a casting solution on a plate in a substantially airtight chamber;
- (b) mounting a polarizing film on a plate having a hole disposed therein, whereby said hole and said polarized film together define a chamber for containing a liquid;
- (c) aging said mounted film;
- (d) filling said chamber with a softening solution after said aging;
- (e) draining said softening solution;
- (f) allowing said film to dry;
- (g) putting said film and said lens in facing spaced relationship to each other, with the surface of the lens to be adhered to the film in facing relationship to the surface of the film to be adhered to the lens;
- (h) advancing said lens toward said film to the point where said film and said lens are in intimate contact; and
- (i) curing said film on said lens.

14. A method as in claim 13, wherein softening solution is made by mixing the following:
Distilled Water
Diacetone Alcohol
Normal Propanol
Acetic acid (glacial)
Hydrochloric Acid (37%) (1% in distilled water).

15. A method as in claim 14, wherein the concentrations are as follows:
Distilled Water: 80–150 parts by weight
Diacetone Alcohol: 0–3 parts by weight
Normal Propanol: 1–6 parts by weight
Acetic Acid (glacial): 12–30 parts by weight
Hydrochloric acid (37%) (1% in distilled water ): 0–3 parts by weight.

* * * * *